United States Patent [19]

Corsover et al.

[11] 4,344,088
[45] Aug. 10, 1982

[54] VARIABLE-VELOCITY FILM EXPOSING AND DEVELOPING APPARATUS

[75] Inventors: Stephen L. Corsover, Philadelphia, Pa.; Lawrence W. Dobbins, Woodlynne; Paul B. Pierson, Delran, both of N.J.

[73] Assignee: RCA Corporation, New York, N.Y.

[21] Appl. No.: 179,424

[22] Filed: Aug. 19, 1980

[51] Int. Cl.³ .............................................. H04N 5/86
[52] U.S. Cl. ..................................... 358/132; 354/66
[58] Field of Search ....................... 354/66, 83, 90, 93; 358/132, 302

[56] References Cited

U.S. PATENT DOCUMENTS

| | | | |
|---|---|---|---|
| 3,809,806 | 5/1974 | Walker et al. | 358/132 |
| 4,115,817 | 9/1978 | Suzuki et al. | 354/83 X |
| 4,278,338 | 7/1981 | Baker et al. | 354/83 |

*Primary Examiner*—John H. Wolff
*Assistant Examiner*—Donald McElheny, Jr.
*Attorney, Agent, or Firm*—Samuel Cohen; Joseph Tripoli; Robert Ochis

[57] ABSTRACT

A photographic film recorder includes film-exposing apparatus having a laser light source for exposing the film, and a photographic film-developing apparatus. A film transport means transports the film at the same velocity through both the exposing apparatus and the developing apparatus, under control of a received film velocity signal. The time period each element of the film is in the developer varies inversely with film velocity. A plurality of transfer function look-up tables are provided for translating a received video density signal to a corresponding exposure signal for controlling the laser light source. Means responsive to the film velocity signal selects for use a transfer function look-up table which is appropriate for the time period each element of the film is in the developer.

11 Claims, 2 Drawing Figures

VARIABLE-VELOCITY FILM EXPOSING AND DEVELOPING APPARATUS

This invention relates to scanning laser beam optical recorders, including photographic film exposing apparatus and photographic film developing apparatus, for recording signals produced remotely by a scene-scanning reconnassance camera, and particularly to recorders in which the film is required to pass through the film exposing apparatus at a velocity determined by the operation of the scene-scanning camera.

When a film passes through an exposing apparatus with a varying velocity, and it is desired to have immediate development of the film for observation of the material recorded thereon, it is necessary to transport the film through the film-developing apparatus at the same linear velocity as it is transported through the film-exposing apparatus. Under such circumstances, there is the problem that the time each elemental part of the film is in the developer solution changes inversely with changes in linear film velocity. However, correct film development requires that each elemental part of the film be in a developer solution having a predetermined temperature for a predetermined time period. One answer to the problem of varying linear film speed is to vary the temperature of the developer solution in accordance with film velocity to provide correct development of the film. This is difficult to implement because of the thermal inertia of the developer solution. According to another answer to the problem of varying linear film speed, the developing apparatus can be constructed so that the length of the film immersed in the developer solution is varied directly in accordance with linear film velocity through the developer. This can be done in such a way that the time period each elemental part of the film is in the developer solution is constant, despite changes in the linear velocity of the film. This answer is also unattractive because of the expense and difficulty of its implementation.

In accordance with an example of the present invention, a photographic film is transported through a film-exposing apparatus and a film-developing apparatus at the same linear velocity, controlled by a received film velocity signal. Received video density signals are translated by a transfer function means to corresponding exposure signals for controlling the exposure of the film in the film-exposing apparatus. Means responsive to the film velocity signal modify the transfer function means to compensate for varying time periods the film is in the developer.

Figure 1:
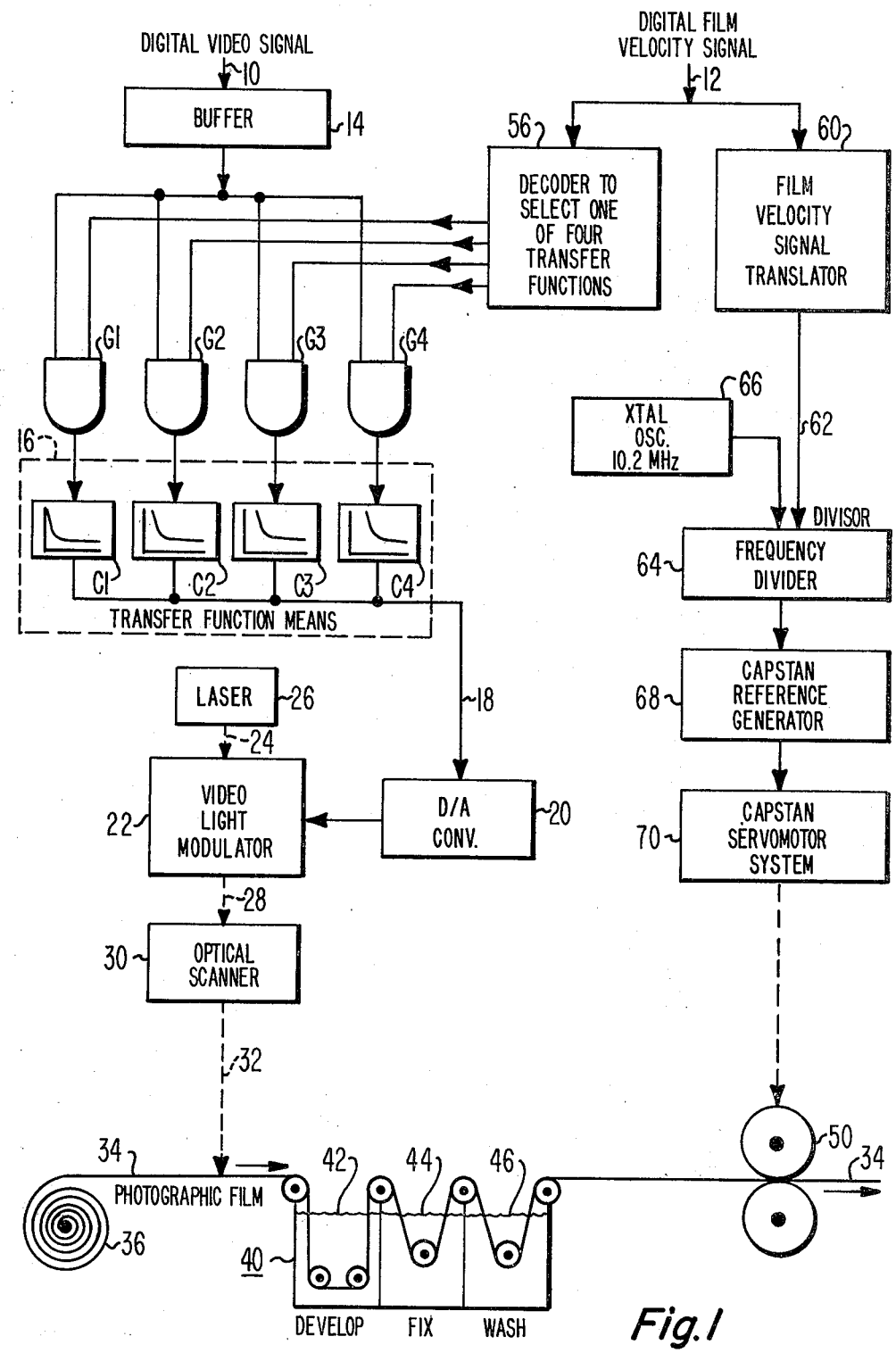
FIG. 1 is a block diagram of a photographic recording system constructed according to the teachings of the invention.

Referring now in greater detail to FIG. 1, the recording system shown is made of conventional known building blocks and it operates in response to two signals from a remote scanning camera. These signals and others are carried on a plurality of conductors, each group of such conductors being represented in the drawing by a single line. One signal is a received digital video signal at 10 representing successive picture elements (pixels) produced at the remote point by a scanning camera. The other signal is a film velocity signal at 12 which, in the present example, has one of 256 values representing the velocity at which the photographic film should pass through the optical scanner of the recorder in order to record the scene as scanned by the remote camera.

The received video signal at 10, which may consist of a succession of pixel signals having eight bits each, is supplied to a conventional buffer 14 from which the pixel signals are made available in a desired clock sequence. The pixel signals are passed through one or another of four "and" gates G1 through G4 to four respective inputs of a transfer function means 16 which includes four respective look-up tables C1 through C4 having four respective characteristics. The look-up tables may be a computer-controlled memory to which the digital video signals are applied as addresses to memory locations containing the corresponding light-modulation signals. As explained later, only one "and" gate is enabled at a time so that only one address is applied to the memory at a time. The output at 18 of the transfer function means is applied through a digital-to-analog converter 20 to control a video light modulator 22 which modulates the light beam 24 from a laser light beam source 26. The modulated light beam 28 from the modulator 22 is applied through a point-by-point and line-by-line optical scanner 30 over a path 32 to a photographic film 34 fed from a source 36 to a film developing apparatus 40. The apparatus 40 includes, in order, a developing solution tank 42, a fixing solution tank 44, and a washing solution tank 46. The film 34 is drawn from the film supply 36 through the film exposing apparatus including the optical scanner 30, and at the same velocity through the film developing apparatus 40, by means of a capstan 50. Means for varying the velocity of the film 34 will now be described.

The received digital film velocity signal at 12, which may consist of eight bits representing any one of 256 values, is applied to a conventional decoder 56 to select one of four transfer functions by enabling a respective one of the four "and" gates G1 through G4. In one practical design, the film velocity signals which correspond with film velocities between 0.4 and 2.80 inches per second, are decoded to provide an output signal enabling gate G1 when the desired velocity is between 0.4 and 0.55 i.p.s., an output signal enabling gate G2 when the desired velocity is between 0.55 and 0.85 i.p.s., an output signal enabling gate G3 when the desired velocity is between 0.85 and 1.10 i.p.s., and an output signal enabling gate G4 when the desired velocity is between 1.10 and 2.80 i.p.s. The enabling of one of "and" gates G1 through G4 causes the received digital video signal from buffer 14 to be applied to a corresponding one of transfer function look-up tables C1 through C4 having chacteristics which will be described in connection with a description of FIG. 2.

The digital film velocity signal at 12 is also applied to the input of a film velocity signal translator 60, consisting of a look-up table by which the film velocity signal is translated to an output divisor signal at 62 used to control a divider 64. The divider 64 divides the frequency of an oscillation received from oscillator 66 by the number represented by the divisor signal. The resulting quotient signal at 65, which may according to the present example, be a frequency in the range of from 1.25 KHz to 14.0 KHz, is applied to a conventional capstan reference generator 68. The output of generator 68 is applied to the usual capstan servo motor system which drives the capstan 50 to provide a film velocity corresponding with the digital film velocity signal received at 12. The film 34 is driven at the same velocity past the optical scanner 30 as it is through the film developing apparatus 40. The film velocity may be any value between 0.4 i.p.s. and 2.8 i.p.s., according to the present example.

The optical recorder of FIG. 1 operates in conformity with the operation of a remote camera apparatus which scans a scene and transmits signals to the recorder. The transmitted signals include digital signals representing pixels in the scanned scene, and a digital film velocity signal for controlling the film velocity in the recorder in accordance with the velocity of movement of the camera over the scanned scene. The received digital video signals at 10 represents the desired densities on the photographic film of successive picture elements (pixels). Each pixel density signal must be translated to a pixel modulating signal for application to the video light modulator 22. The correct translation or transfer function depends on many empirically-determined factors, such as, the density-exposure characteristic of the particular photographic film employed, the desired contrast characteristics of the recorded image, the temperature of the developing solution, and the time period the film is in the developing solution.

Figure 2:
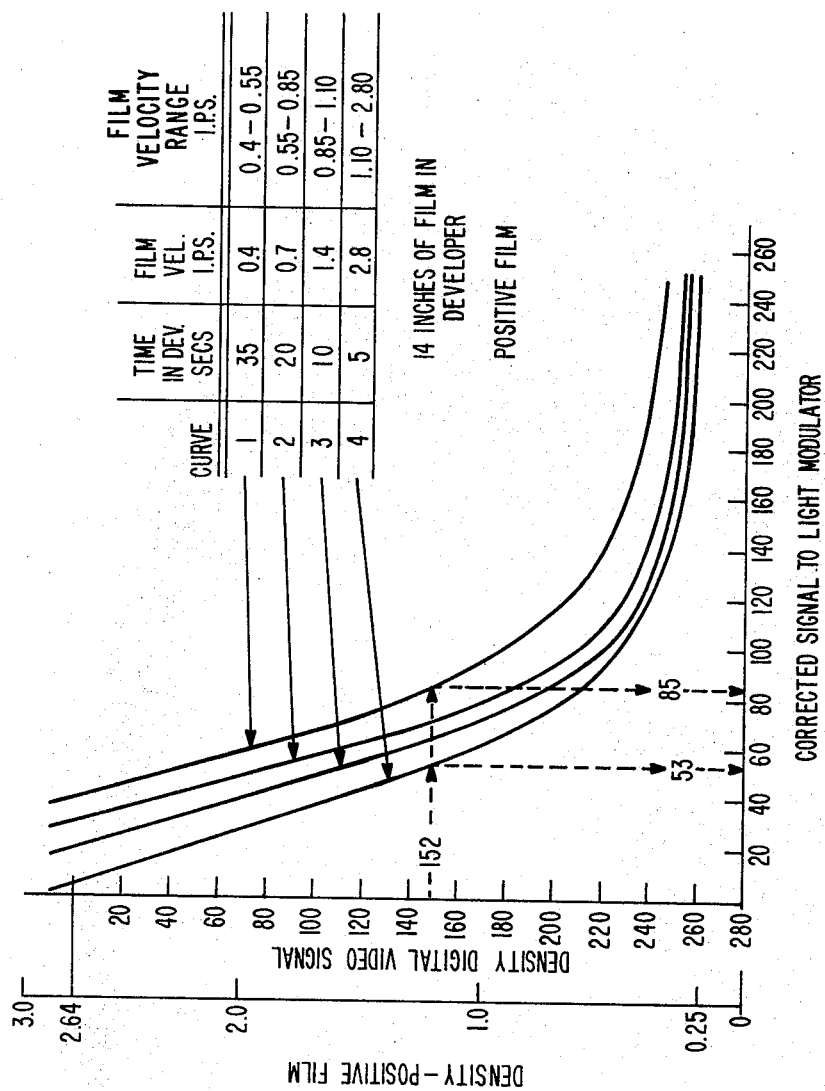
FIG. 2 is a chart showing four different transfer function characteristics each suitable for use at a different range of film velocities.

In the example being described, the film used is an Eastman "Kodak" type S0285 positive film which can be developed in five seconds in a rapid access developer having a temperature of 127 degrees F. Under these conditions, curve 4 in FIG. 2 represents the transfer function between the input digital video signal and a corrected light modulating signal. For example, an input pixel density digital signal having a value of 152 requires a signal to the light modulator having a value of 53. The developing apparatus 40 is constructed so that fourteen inches of the film is in the developer solution 42, and each elemental part of the film is in the developer for five seconds when the film is driven through the exposing and developing apparatus at a velocity of 2.8 i.p.s. The curve 4 in FIG. 2 is the transfer function characteristic provided by the transfer function look-up table C4 in FIG. 1. This look-up table is selected for use by the "and" gate G4 which is energized from the decoder 56 when the input digital film velocity signal at 12 corresponds with a film velocity in the range of from 1.1 i.p.s. to 2.8 i.p.s. The same transfer function look-up table C4 is suitable for all film velocities in the indicated range. The input digital film velocity signal also determines the velocity in the range between 1.1 i.p.s. to 2.8 i.p.s., that the film 34 is driven by capstan 50.

When the received film velocity signal at 12 has a value requiring the film to be driven at a velocity in the range between 0.40 and 0.55 i.p.s., the decoder 56 provides an enabling output to "and" gate G1, so that the received video signal at 10 is applied to the look-up table C1 having the transfer function shown by curve 1 in FIG. 2. In this case, an input density video signal having value of 152, produces a light modulating signal having a value of 85, which is higher than the value 53 provided by curve 4. This illustrates that when the positive film 34 is in the developer solution a longer time, the positive film must be exposed by a more intense light to produce a pixel of the same density. A reversed relationship obtains when the film 34 is a negative film.

When the received film velocity signal has other intermediate values, an appropriate one of the other look-up tables C2 and C3 are employed. Only four look-up tables C1 through C4 are needed, in the present example, for film velocities in the range from 0.4 to 2.8 i.p.s. to produce images of utmost clarity at all film velocity values.

The invention as described in the foregoing is included in a large and complex recording system which has been constructed, and operated, and which is described in considerable detail in a paper by Corsover and Dobbins entitled "A High Resolution In-Line Rapid Wet Processed Laser Recorder" which was given at the SPIE Technical Symposium East in Washington, D.C., April 7–11, 1980, and which is published in the Proceedings thereof under the heading: "222 Laser Scanning and Recording For Advanced Image and Data Handling."

It will be understood that the invention is not limited to the specific example which is described herein, but that the scope of the invention is as braod as is indicated by the appended claims. For example, the photographic film employed may be a wet film developed by any continuous process, including one or more baths, sprays, gel applicators and meniscus applicators, followed by a film dryer. Or, the photographic film may be a dry silver film which is developed by thermal means. It will also be understood that any suitable number of transfer function look-up tables, other than the four tables C1 through C4, may be employed to approximate the conditions throughout the entire range of film velocities. And, the film is preferably driven by more than the one capstan 50 to insure a more accurately-smooth passage past the optical scanner 30 than is necessary in going through film-developing apparatus.

What is claimed is:

1. The combination of,
a photographic film exposing apparatus including a radiation source for exposing the film,
variable transfer function means to translate received video density signals to corresponding exposure signals to control said radiation source,
a photographic film developing apparatus,
variable-velocity film transport means to transport said film at the same velocity through both said exposing apparatus and said developing apparatus,
means responsive to a received film velocity signal to control said variable-velocity film transport means, whereby the time period each element of the film is in the developer varies inversely with film velocity, and
means responsive to said received film velocity signal to modify said variable transfer function means to provide exposure signals appropriate for the time period each element of the film is in the developer.

2. The combination of claim 1 wherein said radiation source is a laser light source.

3. The combination of claim 1 wherein said film exposing apparatus is constructed to expose the film in point-by-point and line-by-line fashion.

4. The combination of claim 1 wherein said variable transfer function means includes a plurality of transfer function look-up tables each being suitable for use during a different range of film velocities and corresponding different range of film developing periods.

5. The combination of claim 4 wherein said means to modify said variable transfer function means includes means responsive to said film velocity signal to select for use an appropriate one of said look-up tables.

6. The combination of claim 5 wherein said received video density signal consists of a succession of digital numbers each representing a picture element.

7. The combination of claim 6, and in addition, computer means including memory for controlling the operation thereof.

8. The combination of claim 7 wherein said plurality of transfer function look-up tables are contained in a memory of said computer means.

9. The combination of claim 8 wherein said film velocity signal is a digital signal.

10. The combination of claim 9 wherein said means to select for use one of said look-up tables includes a decoder receptive to said digital film velocity signal.

11. The combination of,
- a photographic film exposing apparatus including a modulated laser light source for exposing the film in point-by-point and line-by-line fashion,
- a photographic film developing apparatus,
- variable-velocity film transport means operative to transport said film at the same velocity through both said film exposing apparatus and said film developing apparatus,
- means responsive to a received film velocity signal to control the variable-velocity film transport means, whereby the time period each element of the film is in the developer varies inversely with film velocity,
- a plurality of transfer function look-up tables for translating a received video density signal to a corresponding exposure signal to control said laser light source, each look-up table being suitable for use during a different range of film velocities and corresponding different range of film developing periods, and
- means responsive to said film velocity signal to select for use an appropriate one of said look-up tables.

* * * * *